United States Patent
Ryou

(10) Patent No.: US 7,280,041 B2
(45) Date of Patent: Oct. 9, 2007

(54) METHOD OF COMMUNICATING AND DISCLOSING FEELINGS OF MOBILE TERMINAL USER AND COMMUNICATION SYSTEM THEREOF

(75) Inventor: Jung Ryul Ryou, Goyang-si (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 11/154,820

(22) Filed: Jun. 17, 2005

(65) Prior Publication Data

US 2005/0280545 A1    Dec. 22, 2005

(30) Foreign Application Priority Data

Jun. 18, 2004    (KR) .................... 10-2004-0045646

(51) Int. Cl.
- H04M 1/00      (2006.01)
- A61B 5/00      (2006.01)
- G08B 19/00     (2006.01)
- G08B 23/00     (2006.01)

(52) U.S. Cl. ............... 340/539.12; 340/539.1; 340/573.1; 340/575; 340/576; 455/550.1; 455/553.1; 455/576; 600/300; 600/301; 600/306; 128/903; 128/904

(58) Field of Classification Search ........ 340/539.12, 340/573.1, 575–576; 455/550.1, 553.1, 567, 455/575.1; 600/300–301, 306; 128/903–904
See application file for complete search history.

(56) References Cited

U.S. PATENT DOCUMENTS 6,605,038 B1 *   8/2003   Teller et al. ............... 600/300
7,031,745 B2 *   4/2006   Shen ...................... 455/550.1
2003/0139654 A1   7/2003   Kim et al.
2004/0207720 A1 * 10/2004  Miyahara et al. ......... 348/14.02
2005/0001727 A1 * 1/2005   Terauchi et al. ......... 340/573.1
2005/0200452 A1   9/2005   Ikeda et al.

FOREIGN PATENT DOCUMENTS

| EP | 1407713 | 4/2004 |
| KR | 2001-0082395 | 8/2001 |
| WO | 03/077216 | 9/2003 |

OTHER PUBLICATIONS

English Language Abstract of KR 2001-0082395; Aug. 30, 2001.

* cited by examiner

Primary Examiner—Benjamin C. Lee
Assistant Examiner—Lam Pham
(74) Attorney, Agent, or Firm—Greenblum & Bernstein, P.L.C.

(57) ABSTRACT

The present invention provides a method of communicating and disclosing feelings of a mobile terminal user and communication system thereof, by which a user's feeling state can be delivered to a counter party by real time as well as voice, video, characters, text, and the like are transmitted/received. The present invention includes collecting bio-information of a mobile terminal user, generating feeling data indicating a feeling of the user using the bio-information, and transmitting the generated feeling data with a communication signal.

39 Claims, 3 Drawing Sheets

METHOD OF COMMUNICATING AND DISCLOSING FEELINGS OF MOBILE TERMINAL USER AND COMMUNICATION SYSTEM THEREOF

This application claims the benefit of the Korean Application No. 10-2004-0045646 filed on Jun. 18, 2004, which is hereby incorporated by reference in its entirety.

BACKGROUND OF THE INVENTION

1. Field of the Invention

The present invention relates to a mobile terminal, and more particularly, to a method of communicating and disclosing feelings of a mobile terminal user and communication system thereof, by which feelings can be communicated between users.

2. Discussion of the Related Art

Generally, mobile terminals enable the mutual understanding between their users while moving.

A voice transfer is generally used as a communication method for the mutual understanding using a mobile terminal.

As the corresponding technology rapidly evolves, so the mobile terminal enables to transfer or deliver multimedia including video, characters, texts, and the like as well as voice. Moreover, a mobile communication system for supporting various multimedia transfer functions of mobile terminals has been developed as well. There are various services supportable by a current mobile communication system such as voice communications, video communications, data transfer, SMS (short message service), etc.

However, the above-narrated services just enable to deliver voice, video, characters, text, and the like but fails to deliver a user's current feeling by real time.

SUMMARY OF THE INVENTION

Accordingly, the present invention is directed to a method of communicating and disclosing feelings of a mobile terminal user and communication system thereof that substantially obviate one or more problems due to limitations and disadvantages of the related art.

An object of the present invention is to provide a method of communicating and disclosing feelings of a mobile terminal user and communication system thereof, by which a user's feeling state can be delivered by real time as well as voice, video, characters, text, and the like are transmitted/received.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of communicating feelings of a mobile terminal user according to the present invention includes collecting bio-information of a user, generating feeling data indicating a feeling of the mobile terminal user using the bio-information, and transmitting the generated feeling data with a communication signal.

Preferably, the method further includes extracting the feeling data from the transmitted communication signal. And, the method further includes outputting an indication of the feeling of the mobile terminal user corresponding to the extracted feeling data.

The indication may include at least one of an image, text, and voice indicating the feeling of the user. The image may be one of a still image and a moving picture indicating a facial expression corresponding to a human feeling. The text may indicate at least one of a human feeling and an indication of truthfulness. The voice may be a synthesized sound indicating at least one of a human feeling and an indication of truthfulness. The feeling data may include numbers corresponding to the feelings of the mobile terminal user.

Preferably, the method further includes comparing the extracted feeling data with data in a look-up table, and outputting an indication of the feeling of the mobile terminal user based on the comparison to the data in the look-up table.

The bio-information may include at least one of physiological information and biorhythm information of the mobile terminal user. The physiological information may correspond to at least one action of an autonomic nervous system of the mobile terminal user. The physiological information may include at least one of body temperature, respiration, pulse, electric skin reflection degree, blood pressure, and blood flow measurements made by a mobile terminal of the mobile terminal user The communication signal may include a voice signal for a voice communication, the feeling data may be transmitted via a traffic channel allocated to a transmission of the voice signal, and the feeling data may be encoded on the voice signal. Alternatively, the feeling data may be transmitted via a control channel allocated for a control of the voice communication. The communication signal may also include one of a video signal for a video communication, a short message service signal for a short message service transmission, and a packet signal for a packet transmission.

Preferably, the method also includes receiving the transmitted feeling data with another mobile terminal, and outputting an indication of the feeling of the mobile terminal user based upon the received feeling data.

Preferably, the bio-information is collected during a communication.

In another aspect of the present invention, a communication system for communicating feelings includes a transmitting side mobile terminal including a first unit that collects bio-information of a user, a second unit that generates feeling data indicating a feeling of the user based on the bio-information, and a third unit that transmits the feeling data with a communication signal, and a receiving side mobile terminal including a fourth unit that extracts the feeling data from a signal received from the transmitting side mobile terminal and a fifth unit that outputs an indication of the feeling corresponding to the extracted feeling data.

first unit may include a physiological state collecting unit that extracts physiological information of the user, and a biorhythm generating unit that computes a biorhythm based on a date of birth of the user. The physiological state collecting unit may measure at least one autonomic nervous system action of the user. The physiological state collecting unit may include at least one of a sensor that measures a body temperature of the user, a sensor that measures a respiration of the user, a sensor that measures a pulse of the user, a sensor that measure an electric skin reflection degree of the user, a sensor that measures a blood pressure of the user, and a sensor that measures a blood flow of the user.

The feeling data may include numbers indicating the feelings of the user. The third unit may encode the feeling data on the communication signal.

The communication signal may include a voice signal for a voice communication, and the feeling data may be transmitted via a traffic channel allocated to a transmission of a voice signal. Alternatively, the feeling data may be transmitted via a control channel allocated for a control of a voice communication. The communication signal may also include one of a video signal for a video communication, a short message service signal for a short message signal transmission, and a packet signal for a packet transmission.

The receiving side mobile terminal may include a look-up table that stores data correlating extracted feeling data with feeling indication information. The look-up table may store statistical numeric values corresponding to computed human feelings. The fifth unit may search the look-up table to compare a value of the feeling data extracted by the fourth unit and then output an indication of the feeling corresponding to a result of the comparison.

The fifth unit may output at least one of an image, text, and voice. The image may be one of a still picture and a moving picture indicating a facial expression corresponding to a human feeling. The text may indicate at least one of a human feeling and an indication of truthfulness. The voice may be a synthesized sound indicating at least one of a human feeling and an indication of truthfulness.

The bio-information may be collected during a communication.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a communication for delivering feeling according to the present invention basically supports at least one service of voice communications, video communications, message transfer communications (e.g., SMS), and packet communications.

Figure 1:
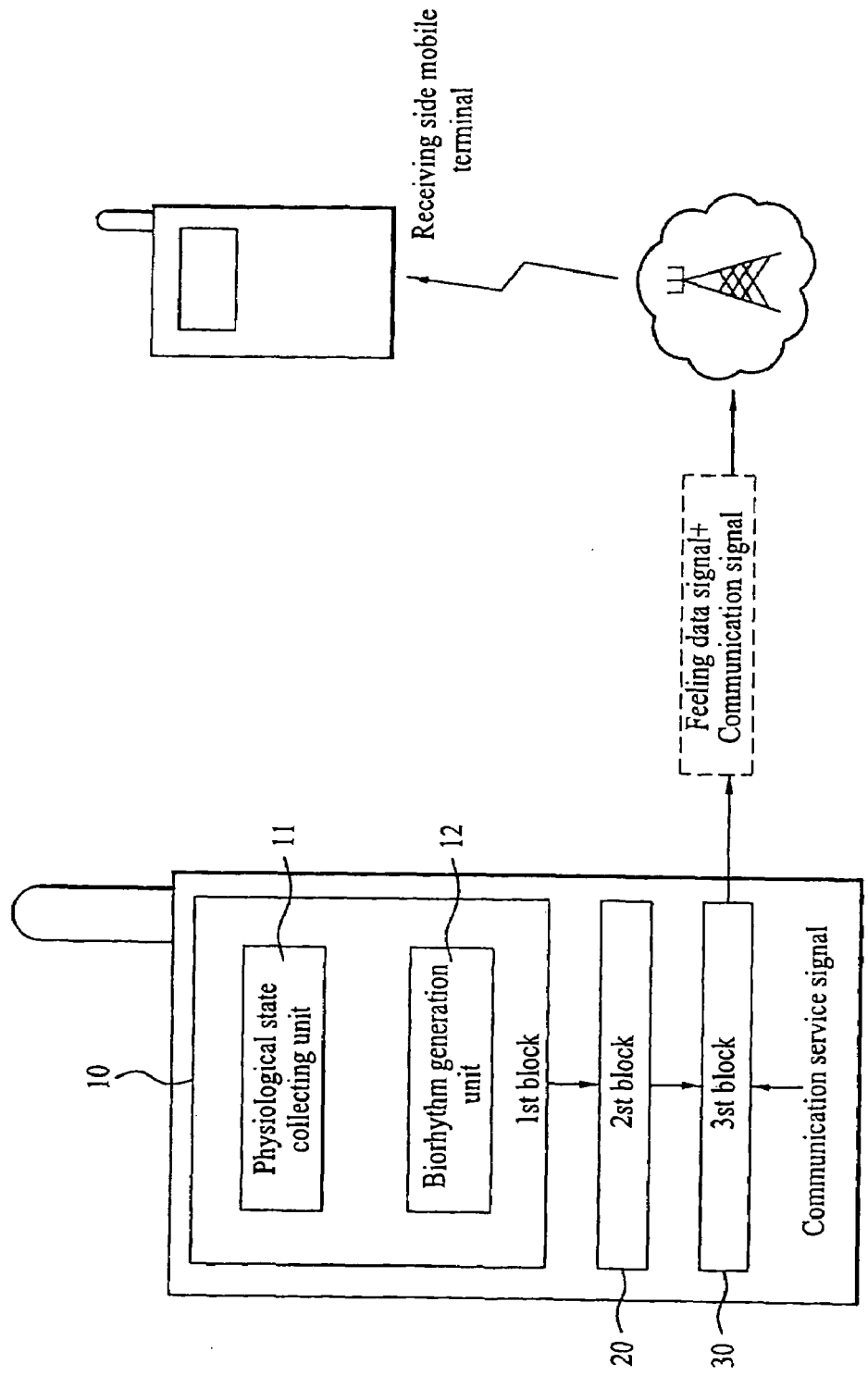
FIG. 1 is a block diagram of a transmitting side mobile terminal according to the present invention.
Figure 2:
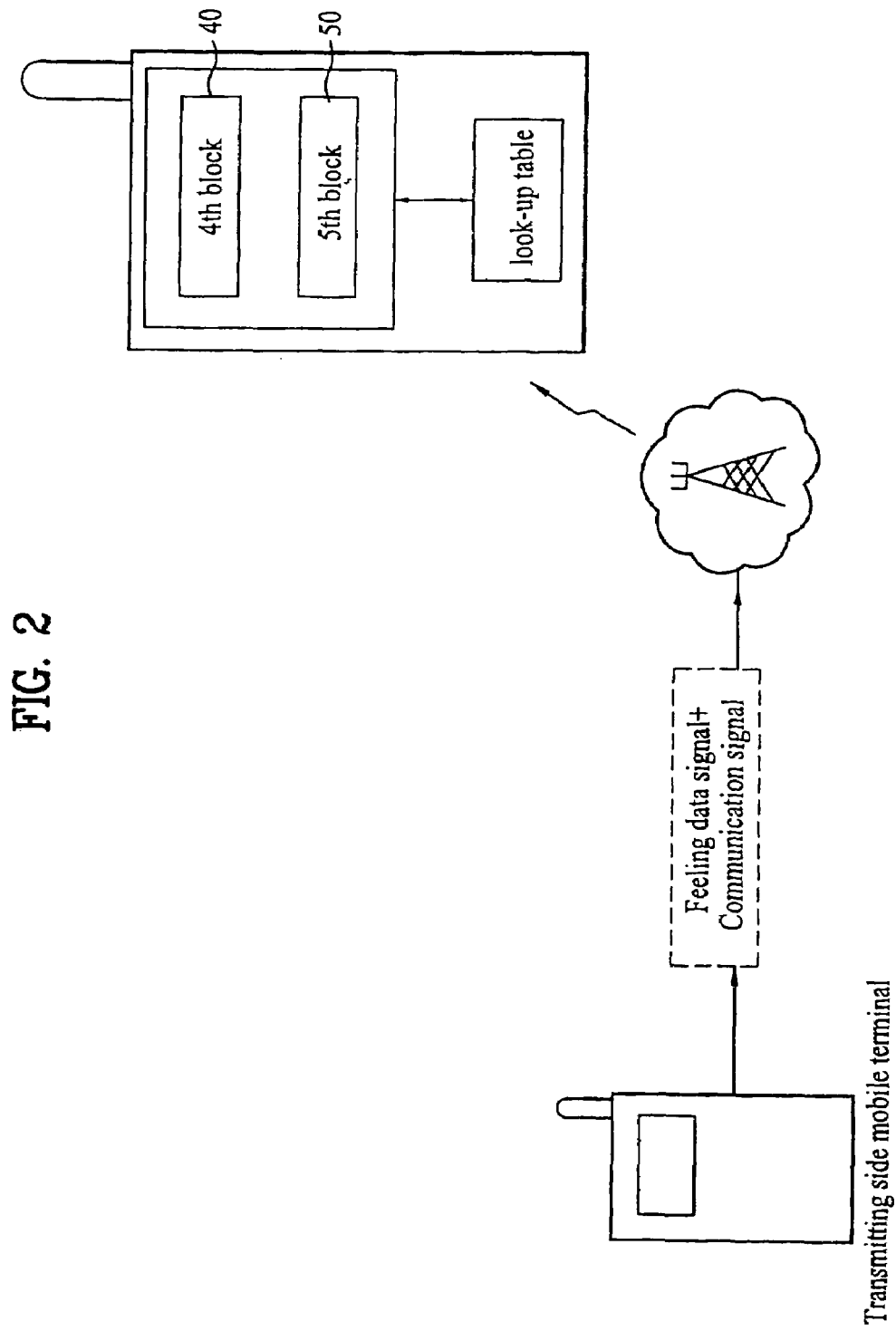
FIG. 2 is a block diagram of a receiving side mobile terminal according to the present invention.

Hence, transmitting and receiving side mobile terminals shown in FIG. 1 and FIG. 2 support the service(s) of the communication system, thereby enabling to transfer multimedia including video, characters, text, data, and the like as well as voice.

FIG. 1 is a block diagram of a transmitting side mobile terminal according to the present invention.

Referring to FIG. 1, a transmitting side mobile terminal according to the present invention includes a first block 10 periodically collecting bio-informations of a sender who is currently communicating, a second block 20 generating feeling data indicating a current feeling state of the sender using the bio-informations collected by the first block 10, and a third block 30 transferring the feeling data generated from the second block 20 together with a signal of a currently used communication service. Moreover, the transmitting side mobile terminal further includes a block for converting the feeling data to a transmittable signal format to enable the feeling data to be transferred together with the signal of the currently used service.

The first block 10 includes a physiological state collecting unit 11 and a biorhythm generating unit 12.

The physiological state collecting unit 11 extracts the bio-informations of the sender who is currently communicating. The physiological state collecting unit 11 includes a plurality of sensors for measuring a physiological state of the sender, i.e., action of the autonomic nervous system. The sensors may include a first sensor for measuring a body temperature of the sender, a second sensor for measuring a respiration of the sender, a third sensor for measuring a pulse of the sender, a fourth sensor for measuring a degree of electric skin reflection of the sender, a fifth sensor for measuring a blood pressure of the sender, and a sixth sensor for measuring a blood flow of the sender. For example, the second sensor measures the respiration by recognizing the sound and volume of breathing. The sensors for measuring the action of the autonomic nervous system of the sender are addible or changeable if necessary, and are not limited to these examples.

The biorhythm generating unit 12 computes a current biorhythm based on date of birth previously inputted by the sender.

The third block 30 encodes the feeling data generated from the second block 20 on a communication signal, i.e., a signal of a communication service the sender is currently using, and then transfers the encoded data/signal.

In this case, the communication signal is a voice signal for a voice communication. Hence, the feeling data generated from the second block 20 is transmitted via a traffic channel allocated to the transmission of the voice signal. In order to avoid having influence on a load of the traffic channel, it is also able to transmit the feeling data via a control channel allocated for a control of the voice communication. Such a channel adoption can be variously modified according to a channel adopting method of a communication system.

Besides, the communication signal may be a video signal for a video communication, an SMS signal for character transmission, or a packet signal for a packet communication. Namely, the communication signal depends on the kind of the mutual communications.

The feeling data generated from the second block 20 in FIG. 1 is a statistical numerical value representing a feeling of the sender. Namely, the feeling data is a result of a function using the measured values of the autonomic nervous system action as its inputs. The function is implemented by an experiment to be appropriate for expressing a feeling of a normal human being according to an action of the autonomic nervous system.

For instance, statistical numerical values of the feeling data are set to 1~3, respectively. First of all, it is assume that '1', '2', and '3' indicate an 'excited state', a 'normal state', and an 'angry state', respectively. And, it is also assumed that result values '1~30', '31~60', and '61~90' of the function correspond to the numerical values '1', '2', and '3' of the feeling data, respectively. A predetermined input value is inputted to the function of computing the feeling data by substitution. By confirming the computed result of the substitution corresponds to which one of the statistical numerical values, a feeling data value is found to be transmitted to a receiving side.

FIG. 2 is a block diagram of a receiving side mobile terminal according to the present invention.

Referring to FIG. 2, a receiving side mobile terminal according to the present invention includes a fourth block 40 extracting feeling data from a signal received from a transmitting side mobile terminal of FIG. 1 and a fifth block 50 disclosing a feeling corresponding to the feeling data extracted from the fourth block 40. And, the receiving side mobile terminal further includes a block (not shown in the drawing) converting a signal format of the feeling data extracted from the fourth block 40 to a value analyzable in an internal processor.

Moreover, the receiving side mobile terminal further includes a look-up table 60 for searching a sender's feeling corresponding to the feeling data extracted from the fourth block 40.

The look-up table 60 generalizes human feelings to turn into numerical values. And, the look-up table 60 stores various kinds of human feelings previously calculated into statistical numerical values. Moreover, the look-up table 60 includes output data corresponding to the various feelings. The output data are outputted via output means (display window and/or speaker) of the mobile terminal.

Hence, the fifth block 50 searches to compare the value of the feeling data extracted from the fourth block 40 to the statistical numerical values of the look-up table 60, searches a value corresponding to a result of the comparison to grasp the corresponding feeling, and then outputs an output data corresponding to the grasped feeling via an output means.

For instance, the statistical numerical values stored in the look-up table according to the respective feelings are set to 1 to 3, respectively. And, it is assumed that '1', '2', and '3' indicate an 'excited state', a 'normal state', and an 'angry state', respectively. If the value of the feeling data extracted from the fourth block 40 is '3', the fifth block grasps that the sender is in the 'angry state' by referring to the look-up table 60 and then outputs the output data corresponding to the 'angry state'.

Consequently, by referring to the look-up table 60, the fifth block 50 outputs the feeling state corresponding to the feeling data extracted from the fourth block 40 in the form of one of text or voice. Instead, the fifth block 50 may output the feeling corresponding to the extracted feeling data in the form of combination including at least one of image, text, and voice. Specifically, the output data stored in the look-up table are listed as following: 1) Images—still pictures and/or moving pictures disclosing facial expressions according to human feelings (angry, smiling, normal, etc.); 2) Texts— sentences or paragraphs disclosing human feeling (angry, pleasant, normal, etc.) or indications of truthfulness (lying or telling truth currently); and 3) voices—sounds (synthesized) expressing human feeling or indications of truthfulness.

As can be seen from the above description, the transmitting side mobile terminal transmits the feeling of the sender who is currently in communications by real time and the receiving side mobile terminal grasps the current feeling of the sender while in communications.

Figure 3:
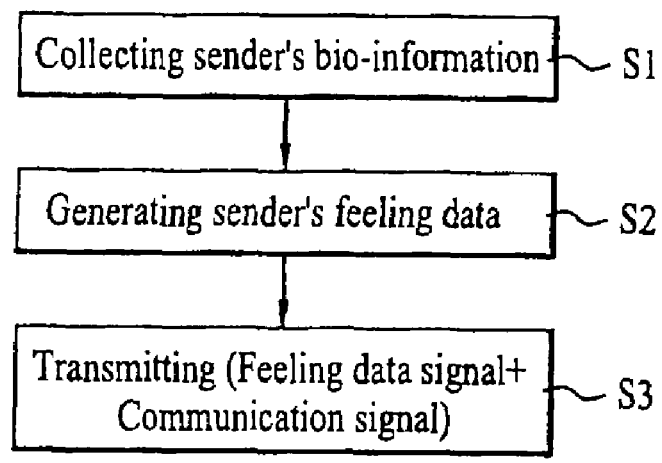
FIG. 3 is a flowchart of a method of collecting, inserting, and transferring feelings using a transmitting side mobile terminal according to the present invention.

FIG. 3 is a flowchart of a method of collecting, inserting, and transferring feelings using a transmitting side mobile terminal according to the present invention.

Referring to FIG. 3, a transmitting side mobile terminal is currently communicating with a receiving side mobile terminal. In doing so, the transmitting side mobile terminal periodically collects bio-informations of a sender (S1).

In this case, the bio-informations include sender's physiological information and sender's current biorhythm information.

The physiological information is for the action of the autonomic nervous system of the sender in calling, and more specifically, for sender's body temperature, respiration, pulse, degree of electric skin reflection, blood pressure, and blood flow which are measured by the transmitting side mobile terminal.

And, the biorhythm information is computed based on the date of birth previously inputted by the sender.

The transmitting side mobile terminal generates feeling data disclosing a current feeling of the sender in communication using the collected bio-informations (S2).

In this case, the generated feeling data is a statistical numerical value representing the sender's current feeling.

Subsequently, the transmitting side mobile terminal transmits the generated feeling data together with a communication signal, i.e. a signal of a currently used communication service (S3). Moreover, the present invention may further include a step of converting the generated feeling data to a signal format that is transmittable together with the signal of the current communication system to be appropriate for the diversification of communication systems. Such a converting step is optional.

In case of currently-using a voice communication service, the transmitting side mobile terminal transmits the feeling data together with a voice signal for the voice communication. Specifically, the transmitting side mobile terminal transmits the generated feeling data via a traffic channel allocated to the transmission of the voice signals. Instead, the transmitting side mobile terminal may transmit the generated feeling data via a control channel allocated for a control of the voice communication. Such a channel use can be variously modified according to a channel use method of the communication system. The feeling data may be transmitted via any other type of channel as well, as the present invention is not limited to transmission via any particular type of channel. Meanwhile, the transmitting side mobile terminal transmits the feeling data together with the voice signal in a manner that the feeling data is encoded on the voice signal to transmit via the corresponding channel, for example.

Besides, in case of currently using a video communication service, the transmitting side mobile terminal transmits the feeling data together with a video signal for the video communication. In case of currently using SMS (short message service), the transmitting side mobile terminal transmits the feeling data together with a short message signal. In case of currently using a packet communication service, the transmitting side mobile terminal transmits the feeling data together with a packet signal. Meanwhile, the feeling data is transmitted in various forms according to what communication service the transmitting and receiving side mobile terminals are currently using.

Figure 4:
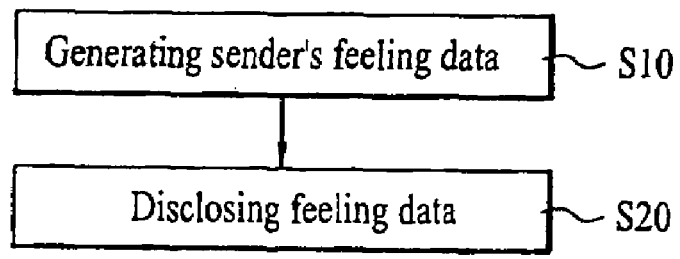
FIG. 4 is a flowchart of disclosing feelings using a receiving side mobile terminal according to the present invention.

FIG. 4 is a flowchart of disclosing feelings using a receiving side mobile terminal according to the present invention.

Referring to FIG. 4, a receiving side mobile terminal, which is in mutual communications, periodically extracts feeling data from a received signal (S10). This is to disclose sender's current feelings in mutual communications.

The receiving side mobile terminal discloses the extracted feeling data via various means (e.g., display window and/or speaker) (S20). In this case, the disclosed feeling data has one of image, text, and voice forms expressing the sender's current feeling. Instead, the feeling data may have a combination form including at least one of image, text, and voice.

Examples of forms of disclosing the feeling data are listed as following: 1) Images—still pictures and/or moving pictures disclosing facial expressions according to human feelings (angry, smiling, normal, etc.); 2) Texts—sentences or paragraphs disclosing human feeling states (angry, pleasant, normal, etc.) or polygraphing results (lying or telling truth currently); and 3) voices—sounds (synthesized) expressing human feeling states or polygraphying results.

For additional instance, in case of using a mobile terminal equipped with a look-up table including statistical numerical values corresponding to various feelings by generalizing human feelings and output data corresponding to the various feelings, the receiving side mobile terminal previously searches to compare a value of the extracted feeling data to the statistical numerical values of the previously prepared look-up table, searches a value corresponding to a result of the comparison to grasp the corresponding feeling, and then discloses output data corresponding to the grasped feeling data. In doing so, the output data correspond to the disclosed forms of the feeling data.

Accordingly, the present invention delivers the user's feeling by real time as well as transmits/receives voice/image(video)/characters/text, etc., thereby enabling efficient transfer of intensions (mutual understanding) between the sender and recipient.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of communicating feelings of a mobile terminal user, comprising:
   collecting bio-information of the mobile terminal user;
   generating feeling data indicating a feeling of the mobile terminal user using the bio-information; and
   transmitting the generated feeling data with a communication signal;
   wherein the bio-information includes at least one of physiological information and biorhythm information of the mobile terminal user.

2. The method according to claim 1, further comprising, extracting the feeling data from the transmitted communication signal.

3. The method according to claim 2, further comprising, outputting an indication of the feeling of the mobile terminal user corresponding to the extracted feeling data.

4. The method according to claim 3, wherein the indication comprises at least one of an image, text, and voice indicating the feeling of the user.

5. The method according to claim 4, wherein the image is one of a still picture and a moving picture indicating a facial expression corresponding to a human feeling.

6. The method according to claim 4, wherein the text indicates at least one of a human feeling and an indication of truthfulness.

7. The method according to claim 4, wherein the voice is a synthesized sound indicating at least one of a human feeling and an indication of truthfulness.

8. The method according to claim 2, further comprising:
   comparing the extracted feeling data with data in a look-up table; and
   outputting an indication of the feeling of the mobile terminal user based on the comparison to the data in the look-up table.

9. The method according to claim 8, wherein the data in the look-up table corresponds to at least one of an image, text, and voice indicating the feeling of the mobile terminal user.

10. The method according to claim 9, wherein the image is one of a still picture and a moving picture indicating a facial expression corresponding to a human feeling.

11. The method according to claim 9, wherein the text indicates at least one of a human feeling and an indication of truthfulness.

12. The method according to claim 9, wherein the voice is a synthesized sound indicating at least one of a human feeling and an indication of truthfulness.

13. The method according to claim 1, wherein the feeling data comprises numbers corresponding to the feelings of the mobile terminal user.

14. The method according to claim 1, wherein the physiological information corresponds to at least one action of an autonomic nervous system of the mobile terminal user.

15. The method according to claim 1, wherein the physiological information comprises at least one of body temperature, respiration, pulse, electric skin reflection degree, blood pressure, and blood flow measurements made by a mobile terminal of the mobile terminal user.

16. The method according to claim 1, wherein the communication signal comprises a voice signal for a voice communication.

17. The method according to claim 16, wherein the feeling data is transmitted via a traffic channel allocated to a transmission of the voice signal.

18. The method according to claim 17, wherein the feeling data is encoded on the voice signal.

19. The method according to claim 16, wherein the feeling data is transmitted via a control channel allocated for a control of the voice communication.

20. The method according to claim 1, wherein the communication signal comprises one of a video signal for a video communication, a short message service signal for a short message service transmission, and a packet signal for a packet transmission.

21. The method according to claim 1, further comprising:
   receiving the transmitted feeling data with another mobile terminal; and
   outputting an indication of the feeling of the mobile terminal user based upon the received feeling data.

22. The method according to claim 1, wherein the bio-information is collected during a communication.

23. A communication system for communicating feelings, comprising:
   a transmitting side mobile terminal comprising a first unit that collects bio-information of a user, a second unit that generates feeling data indicating a feeling of the user based on the bio-information, and a third unit that transmits the feeling data with a communication signal; and a receiving side mobile terminal comprising a fourth unit that extracts the feeling data from a signal received from the transmitting side mobile terminal and a fifth unit that outputs an indication of the feeling corresponding to the extracted feeling data;

wherein the first unit comprises at least one of a physiological state collecting unit that extracts physiological information of the user and a biorhythm generating unit that computes a biorhythm based on a date of birth of the user.

24. The communication system according to claim 23, wherein the physiological state collecting unit measures at least one autonomic nervous system action of the user.

25. The communication system according to claim 23, wherein the physiological state collecting unit comprises at least one of:
  a sensor that measures a body temperature of the user;
  a sensor that measures a respiration of the user;
  a sensor that measures a pulse of the user;
  a sensor that measures an electric skin reflection degree of the user;
  a sensor that measures a blood pressure of the user; and
  a sensor that measures a blood flow of the user.

26. The communication system according to claim 23, wherein the feeling data comprises numbers indicating the feelings of the user.

27. The communication system according to claim 23, wherein the third unit encodes the feeling data on the communication signal.

28. The communication system according to claim 23, wherein the communication signal comprises a voice signal for a voice communication.

29. The communication system according to claim 23, wherein the feeling data is transmitted via a traffic channel allocated to a transmission of a voice signal.

30. The communication system according to claim 23, wherein the feeling data is transmitted via a control channel allocated for a control of a voice communication.

31. The communication system according to claim 23, wherein the communication signal comprises one of a video signal for a video communication, a short message service signal for a short message signal transmission, and a packet signal for a packet transmission.

32. The communication system according to claim 23, wherein the receiving side mobile terminal further comprises a look-up table that stores data correlating extracted feeling data with feeling indication information.

33. The communication system according to claim 23, the receiving side mobile terminal further comprises a look-up table storing statistical numeric values corresponding to computed human feelings.

34. The communication system according to claim 33, wherein the fifth unit searches the look-up table to compare a value of the feeling data extracted by the fourth unit and then outputs an indication of the feeling corresponding to a result of the comparison.

35. The communication system according to claim 23, wherein the fifth unit outputs at least one of an image, text, and voice.

36. The communication system according to claim 35, wherein the image is one of a still picture and a moving picture indicating a facial expression corresponding to a human feeling.

37. The communication system according to claim 35, wherein the text indicates at least one of a human feeling and an indication of truthfulness.

38. The communication system according to claim 35, wherein the voice is a synthesized sound indicating at least one of a human feeling and an indication of truthfulness.

39. The communication system according to claim 23, wherein the bio-information is collected during a communication.

* * * * *